(No Model.)
P. M. HARDY.
COMBINED HOE AND CUTTER.
No. 250,526. Patented Dec. 6, 1881.
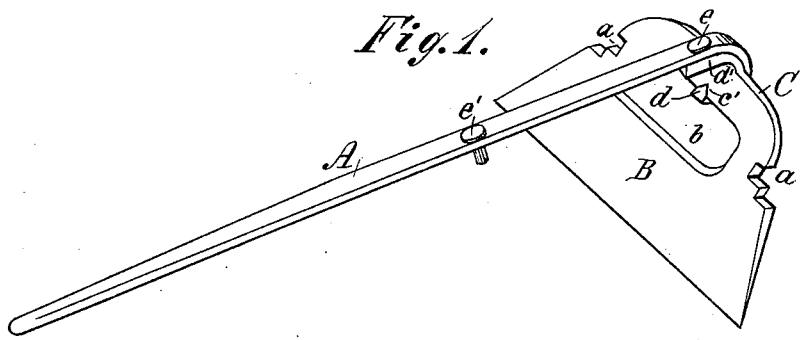
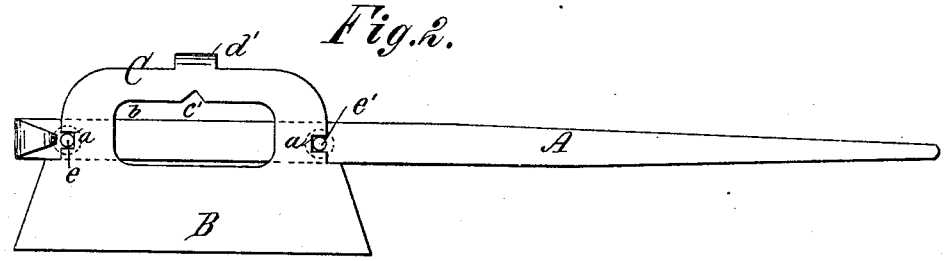
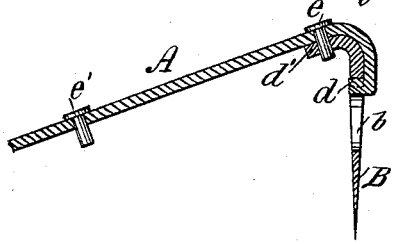
WITNESSES:
Theo.g. Hoster
C. Sedgwick
INVENTOR:
P. M. Hardy
BY Munn & Co.
ATTORNEYS.

UNITED STATES PATENT OFFICE.

PARROTT M. HARDY, OF AURORA, NORTH CAROLINA, ASSIGNOR TO HIMSELF AND JOE B. BRYAN, OF SAME PLACE.

COMBINED HOE AND CUTTER.

SPECIFICATION forming part of Letters Patent No. 250,526, dated December 6, 1881.

Application filed May 26, 1881. (No model.)

*To all whom it may concern:*

Be it known that I, PARROTT M. HARDY, of Aurora, in the county of Beaufort and State of North Carolina, have invented an Improved Combined Hoe and Cutter, of which the following is a specification.

The invention consists in the improvement of a hoe and cutter by constructing the blade and handle relatively as hereinafter described.

In the accompanying drawings, Figure 1 is a perspective view of my invention with the blade attached to the end of the handle. Fig. 2 is a side elevation with the blade attached to the side of the handle, and Fig. 3 is a section, longitudinally, through the handle and blade.

Similar letters of reference indicate corresponding parts.

In carrying my invention into effect I prefer to form the blade B with the notches $a\ a$ in its upright edges, and to form the cut-away portion $b$ through it, as shown. In the lower edge of the upper cross-piece, C, in the center, I form the triangular notch $c'$, into which the projection $d$ of the handle A fits when the blade is placed on the end of the handle, and to the upper edge of the cross-piece C, and immediately over the notch $c'$, I provide the bent arm $d'$, which arm is perforated for the reception of the bolt or pin $e$ of the handle. The end of the handle A is curved, as shown, and is of such form as to reach over and fit the arm $d'$ and cross-piece C upon the outside, and the projection $d$ thereof, to fit closely in the notch $c'$, so that when the pin $e$ is in place, as shown in Figs. 1 and 2, the blade and handle will be secured firmly together.

When the implement is to be used for cutting purposes the blade is to be detached from the end of the handle, which is easily done by simply partially removing the pin $e$ and sliding or tipping the blade forward and placing it upon the side of the handle, as shown in Fig. 2, in which position the pin $e$ and the pin $e'$ of the handle fit into the notches $a\ a$ in the upright sides of the blade, and serve to hold the blade in place.

The cut-away portion $b$ has advantage, in that it prevents the unnecessary clogging of the hoe.

It is obvious that other means by which the blade may be detached from the end of the handle and secured to the side of the handle might be devised and not depart from the spirit of my invention; but the construction shown and described is cheap, simple, and efficient.

Having thus described my invention, I claim as new and desire to secure by Letters Patent—

The blade B, formed with the side notches, $a\ a$, and the central notch, $c'$, and the upwardly-curved and perforated arm $d'$, in combination with the handle A, formed with the curved end and projection $d$, and provided with the pins $e\ e'$, whereby the hoe is adapted to be removed from the end of the handle and placed upon the side thereof, substantially as and for the purpose specified.

PARROTT M. HARDY.

Witnesses:
HENRY HARDING,
JOSEPH B. BRYAN.